(12) United States Patent
Chiu et al.

(10) Patent No.: US 10,664,428 B2
(45) Date of Patent: May 26, 2020

(54) SAS AUTOMATIC ZONING MECHANISM

(71) Applicant: QUANTA COMPUTER INC., Taoyuan (TW)

(72) Inventors: Yang-Li Chiu, Taoyuan (TW); Tsu-Tai Kung, Taoyuan (TW); Hou-Lung Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/135,206

(22) Filed: Sep. 19, 2018

(65) Prior Publication Data

US 2020/0089641 A1    Mar. 19, 2020

(51) Int. Cl.
| | |
|---|---|
| *G06F 13/40* | (2006.01) |
| *G06F 3/06* | (2006.01) |
| *H01R 13/641* | (2006.01) |
| *H04L 12/935* | (2013.01) |

(52) U.S. Cl.
CPC ........ *G06F 13/4022* (2013.01); *G06F 3/0626* (2013.01); *G06F 3/0629* (2013.01); *G06F 3/0689* (2013.01); *H01R 13/641* (2013.01); *H04L 49/30* (2013.01); *G06F 2213/0028* (2013.01)

(58) Field of Classification Search
None
See application file for complete search history.

(56) References Cited

U.S. PATENT DOCUMENTS

| | | |
|---|---|---|
| 8,275,938 B2 | 9/2012 | Nakajima et al. |
| 9,965,197 B2 | 5/2018 | Chiu et al. |
| 2008/0034122 A1 | 2/2008 | Kubo et al. |
| 2009/0083484 A1* | 3/2009 | Basham ................ G06F 3/0605 711/114 |
| 2016/0203089 A1* | 7/2016 | Natrajan ................ G06F 13/10 711/163 |
| 2016/0246746 A1 | 8/2016 | Tan et al. |

FOREIGN PATENT DOCUMENTS

TW    I569134 B    2/2017

OTHER PUBLICATIONS

Extended European Search Report for EP Application No. 19164487.1, dated Oct. 24, 2019.
TW Office Action for Application No. 108102181, dated Nov. 29, 2019, w/ First Office Action Summary.

\* cited by examiner

*Primary Examiner* — Scott C Sun
(74) *Attorney, Agent, or Firm* — Nixon Peabody LLP; Zhou Lu

(57) ABSTRACT

A system and method for automatic serial-attached SCSI (SAS) zoning configuration. The SAS based architecture includes a local area network and a SAS system having a local area network port coupled to the local area network. The SAS system includes a plurality of SAS target devices, and an expander having a series of input ports and a plurality of target ports. The target ports are coupled to the SAS target devices. A management tool is coupled to the local area network. The management tool is operable to detect a cable connection between a first host device and an input port of the series of input ports. The management tool automatically configures SAS zones to assign target devices to the first host device.

14 Claims, 4 Drawing Sheets

SAS AUTOMATIC ZONING MECHANISM

TECHNICAL FIELD

The present disclosure relates generally to a system for automatic SAS zoning configuration, and more specifically, to a routine on a system that automatically classifies SAS zoning for target devices when a cable is connected to a host.

BACKGROUND

The emergence of the cloud for computing applications has increased the demand for off-site installations, known as data centers, that store data and run applications accessed by remotely connected computer device users. A typical data center has physical chassis structures with attendant power and communication connections. Each rack may hold multiple network devices such as servers for computing, storage, or controls, as well as appropriate network and management switches. Each server may require access to a storage device for storing data. Although storage devices may be set up in a coordinated array, they are more often simply a set of storage disks that require separate access for each of the nodes.

A mechanism for connecting devices to each other for networking purposes is a Serial-attached SCSI (SAS) architecture. The SAS architecture defines a serial device interconnect and transport protocol that provides rules for information exchange between devices. The SAS physical cables are a set of four wires used as two differential signal pairs that allows data to be transmitted in both directions simultaneously. A port for a SAS cable is identified by a unique SAS worldwide name (also called SAS address).

A SAS controller or manager contains one or more SAS ports. A path is a logical point-to-point link between a SAS initiator port in the controller and a SAS target port on a target device (e.g., a storage device such as a hard disk drive). A connection is a temporary association between the controller and the target device through the path.

A SAS expander is a device that enables connections between the controller port and multiple target devices by routing connections via expander ports between the target devices and the controller. Only a single connection through a SAS expander can exist at any given time. Using expanders creates more nodes in the path from the controller to the target device and thus more controllers can be connected to target devices connected to the SAS expander. Therefore, the SAS expander affords network designers greater flexibility.

Traditionally, host devices such as servers are set up according to a predetermined SAS zone in relation to connections to the input/output ports of storage devices in a SAS architecture. The cable connections must be made in accordance with the predetermined zone. Thus, the operator of the system needs to first configure SAS zoning, and then change the SAS cables to match the SAS zoning definition. Otherwise the storage devices in a "just a bunch of disks" (JBOD) storage unit cannot support multiple servers without configuration for SAS zoning. Such a requirement is susceptible to human error when SAS cable connections are changed but a technician forgets to change the SAS zoning when additional server devices are added. For example, a first host server may be connected to a series of storage target devices through a SAS expander. If a second host server is connected to the SAS expander, it will be unable to access the storage target devices unless the SAS zones are reconfigured to recognize the newly connected second server.

Thus, there is a need for an automatic SAS zoning configuration protocol to eliminate human error. There is a further need for a mechanism for automatically changing SAS zoning depending on SAS cable connection to host devices.

SUMMARY

One disclosed example is a system that allows automatic serial-attached SCSI (SAS) zoning configuration. The system includes a local area network and a SAS system. The SAS system has a local area network port coupled to the local area network, a plurality of SAS target devices, and an expander. The expander has a plurality of input ports and a plurality of target ports. At least some of the target ports are coupled to the SAS target devices. A management tool is coupled to the local area network. The management tool is operable to detect a cable connection between a first host device and an input port of the plurality of input ports. The management tool automatically configures a SAS zone to assign target devices to the first host device.

Another disclosed example is a method of automatic configuration of serial-attached SCSI (SAS) zones in a system having a local area network, a management tool, and a SAS system. The SAS system has a local area network port coupled to the local area network, a plurality of SAS target devices, and an expander. The expander has a plurality of input ports and a plurality of target ports. At least some of the target ports are coupled to the SAS target devices. A first host device is coupled to the local area network and one of the input ports of the expander via a cable. A cable connection between the first host device and the input port is detected. A SAS zone is automatically configured to assign target devices to the first host device via the management tool.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
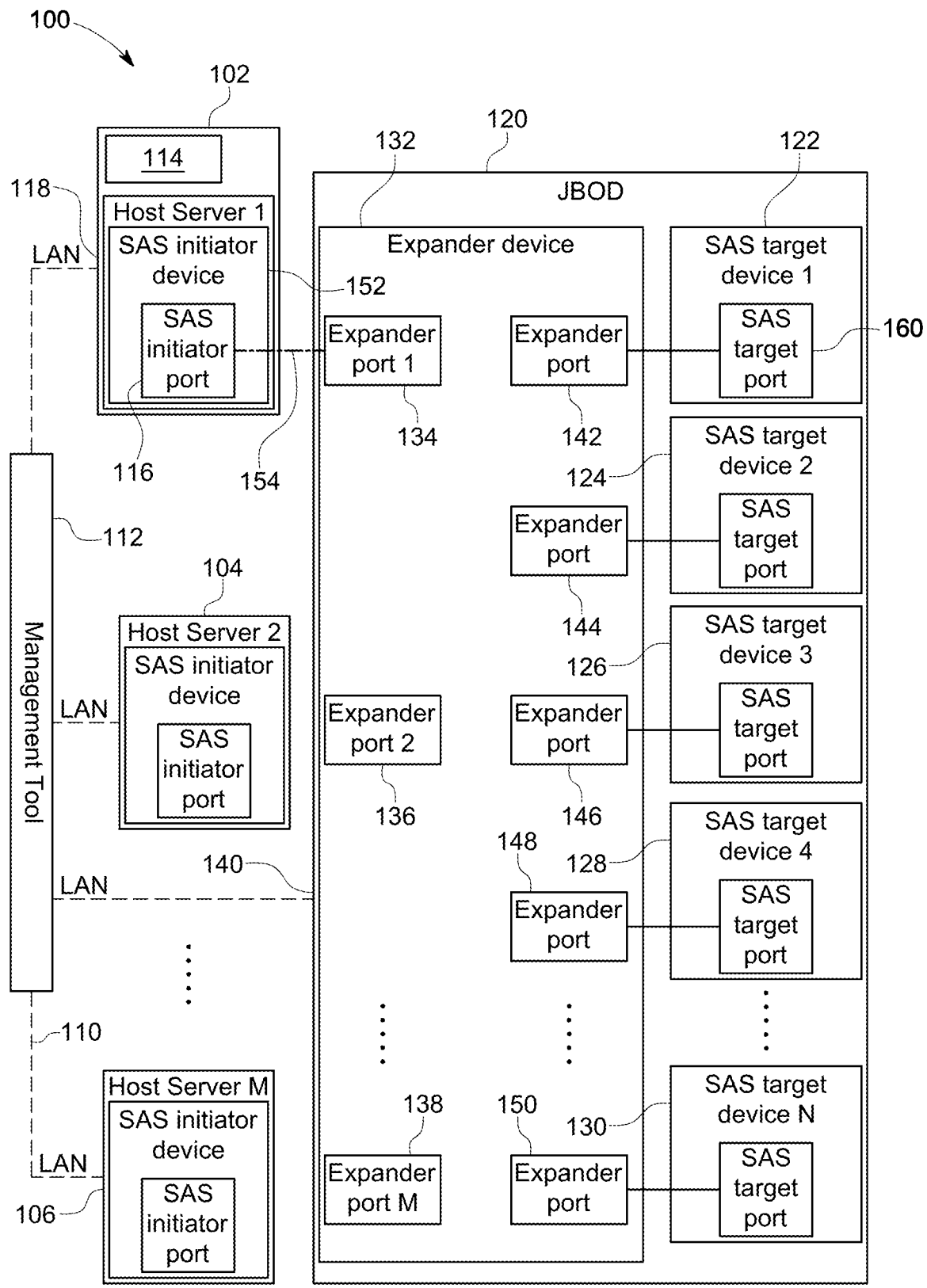
FIG. 1 is a block diagram of an example SAS architecture that includes an automatic SAS zoning configuration mechanism.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

To prevent human error in connecting cables in a SAS based architecture and failing to change the SAS zoning configuration, the present example system operates a SAS automatic zone configuration routine that makes an automatic change in SAS zoning, depending on the connection of SAS cables between a host server and a SAS system.

FIG. 1 is a block diagram of a network system 100 that includes a series of host devices such as the host servers 102, 104, and 106. The host servers 102, 104, and 106 are connected to a local area network 110 that is connected to a management tool 112. The management tool 112 may run on a management controller or other suitable device. Each of the host servers such as the server 102 includes a baseboard management controller (BMC) 114, a SAS initiator device port 116, and a LAN port 118. The BMC 114 controls the operation of the host server 102, including detection of cables connected in the SAS initiator device port 116. The BMC 114 communicates with the management tool 112 via the LAN port 118. The functions of the BMC may be performed through any controller executing a daemon function.

In this example, the network system 100 is based on a SAS architecture. Thus, the system 100 also includes a SAS based storage system 120. The SAS based storage system 120 may be [a just a bunch of disks (JBOD) unit having different storage devices. In this example, the SAS based storage system 120 includes various target devices such as target devices 122, 124, 126, 128, and 130. Each of the target devices 122, 124, 126, 128, and 130 may be independent storage devices such as hard disk drives, solid state drives, or some combination of the same. The SAS based storage system 120 includes an expander device 132. The expander device 132 includes a series of expander input ports, such as expander ports 134, 136, and 138. The SAS device 120 also includes a LAN port 140 to receive commands from the management tool 112. A series of expander target ports, such as expander target ports 142, 144, 146, 148, and 150 may be connected to the target devices. Thus, the expander device 132 has two sides that each include expander ports. One side has input expander ports that may be connected one-by-one to the servers 102, 104, and 106, and the other side has target expander ports that may be connected one-by-one to the SAS target devices 122, 124, 126, 128, and 130.

Each of the host servers, such as the host server 102, includes a SAS initiator device such as the SAS initiator device 152. SAS initiator devices may include a host bus adapter (HBA) or RAID card that allows the host server to use the SAS protocol to communicate with SAS devices such as the SAS device 120 through a cable. The SAS initiator device 152 includes the SAS initiator port 116 that may be connected to one of the input ports of the expander device 132. In this example, a cable 154 connects the initiator port 116 of the host server 102 to the input port 134 of the expander device 132.

Figure 2:
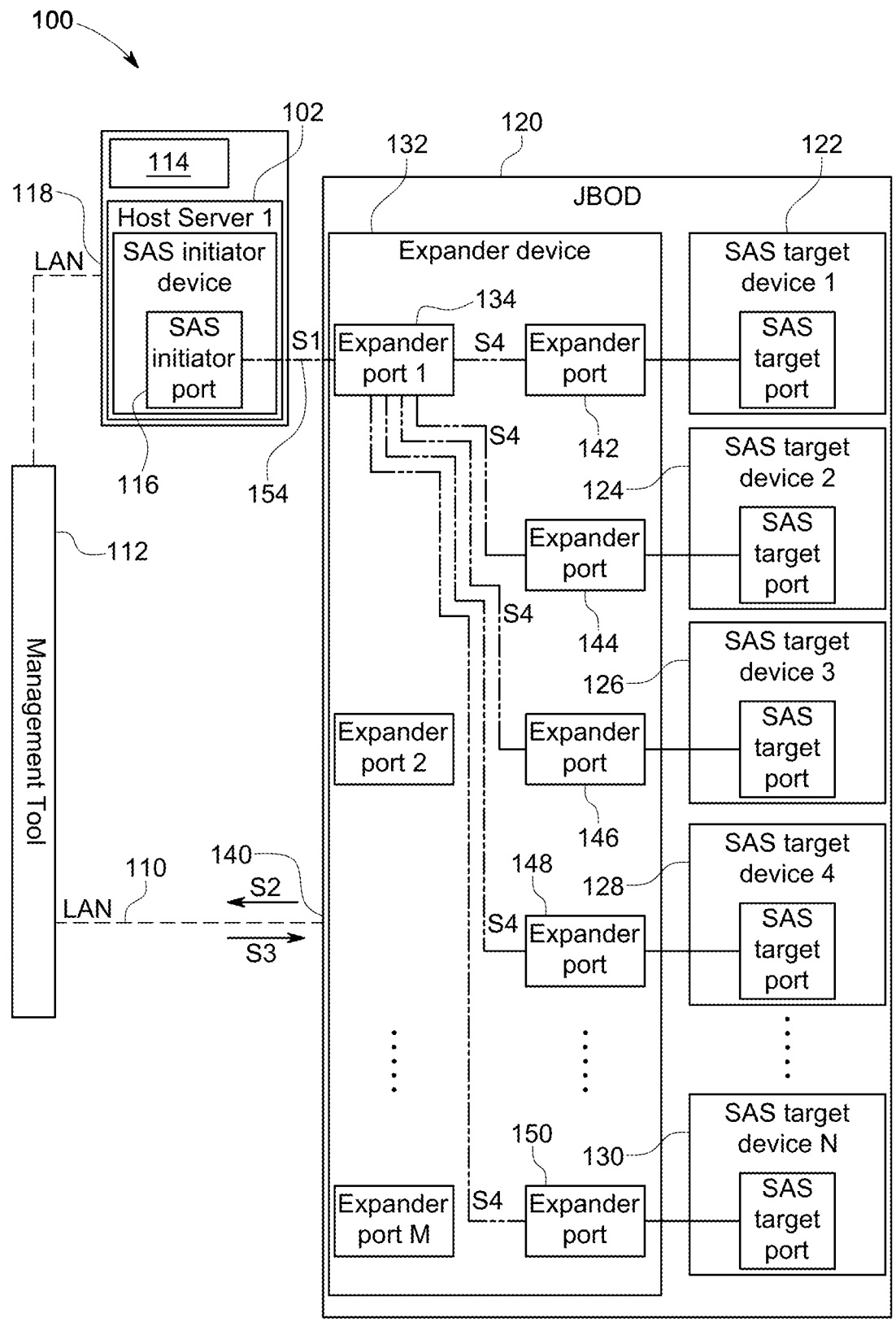
FIG. 2 is a block diagram of the system in FIG. 1 showing the configuration of one SAS zone for a single host server.

In this example, each of the other servers 104 and 106 may be connected to one of the other respective input ports 136 and 138. However, as shown in FIG. 2, neither of the servers 104 or 106 is currently connected to the input ports 136 and 138. Each of the target devices such as the target device 122 may include a SAS target port 160. The target port of each target device is connected via a cable to the expander target ports. After proper SAS zone configuration, the expander device 132 allows host servers to access respective target devices based on the zone configuration. Thus in this example, the zone configuration allocates certain target devices to each server 102, 104, and 106, if the servers 102, 104, and 106 are connected to the input ports of the expander device 132.

The management tool 112 includes a SAS zoning automatic configuration mechanism that functions in the system 100 (in FIG. 1) to automatically establish SAS zoning configurations when new servers are connected to the expander device 132. The SAS zoning configurations are based on predefined rules to define which target devices are to be assigned to different hosts. The configuration mechanism detects the SAS cable connection status for automatic SAS zoning configuration of the SAS storage system 120. In this example, the management tool 112 sends an IPMI/Redfish OEM command to the BMC or daemon of the host server and to the SAS storage system 120 to get a cable ID via a LAN interface over the LAN 110. The cable ID is used for connection status detection. The cable ID may be an EEPROM or SAS Address associated with the cable. Each SAS cable has an EEPROM in both connectors. The EEPROM include a serial number and a part number. The serial number of either EEPROM may be used to determine the host connected to each expander port. The SAS Address may also be used to determine which host computer is connected to each expander port. If the connection status has changed, the management tool 112 sends a SAS zoning automatic configuration command to the SAS storage system 120 to define each SAS zoning configuration depending on SAS cable connections detected by the management tool 112.

In the case of a detected connection between a host server and the SAS storage system 120, the management tool 112 first sends an IPMI/Redfish OEM command to a server, such as the server 102 and the storage device system 120, to get a cable ID for the cable 154 connecting the SAS initiator port 116 of the server 102 to the expander port 134 of the expander device 132. The cable ID is sent via the LAN port 140 and via the host server 102 to the management tool 112 for connection status detection. If the connection status has changed, the management tool 112 sends a SAS automatic zoning configuration command to the SAS storage system 120 via the LAN port 140. If there is no connection change, the routine will continue to get the cable ID. On receiving a new SAS zoning configuration, the SAS storage system 120 will define each SAS zoning configuration depending on the connection of SAS cables detected by the management tool 112.

FIG. 2 shows the operation of automatic SAS zone configuration for the system 100 (in FIG. 1) when a server is initially connected to the SAS storage system 120. Like elements in FIG. 2 are labeled with identical numbers as their counterparts in FIG. 1. The host server, such as the server 102, is connected via the cable 154 to the input expander port 134 of the SAS storage system 120. The management tool 112 first sends an IPMI/Redfish OEM command to a server such as the server 102 and the storage device system 120 to get a cable ID for the cable 154. In this example, the cable 154 connecting the SAS initiator port 116 of the server 102 to the expander input port 134 of the expander device 132 will have an associated cable ID (the cable serial number stored in the cable EEPROM), which is determined by the BMC 114. The cable ID is sent via the LAN port 140 to the management tool 112 for connection status detection. The BMC 114 is used to get the cable ID offline. The offline cable ID is received from the serial number of a cable EEPROM through an I2C connection by the BMC 114 and the expander device 132. The off line cable ID only needs the boot up of the storage device system 120. The boot up allows the BMC 114 to obtain the offline cable ID from the EEPROM in the cable. The online cable ID is received from the SAS address, which is the remote SAS address. The online cable ID requires the host server and storage device 120 to be booted up. The online cable ID (SAS address) is obtained by the BMC 114 from the host bus adapter (HBA) card on the storage device 120. In this example, the management tool 112 finds only one server (server 102) is connected to the SAS storage system 120. The management tool 112 then sends a SAS automatic zoning configure command to the SAS storage system 120. In this example, the configuration allows all of the target devices 122, 124, 126, 128, and 130 to be included in the SAS zone, since only one server has been connected to the expander device 132. The target storage devices 122, 124, 126, 128, and 130, each have respective cables coupled to expander target ports 142, 144, 146, 148, and 150. Thus, the SAS storage system 120 follows the SAS automatic zoning configuration command to set the SAS zoning. FIG. 2 shows the result of an example configuration where the host server 102 can access all SAS target devices 122, 124, 126, 128, and 130 via the expander ports 142, 144, 146, 148, and 150 through the connected input port 134.

Figure 3:
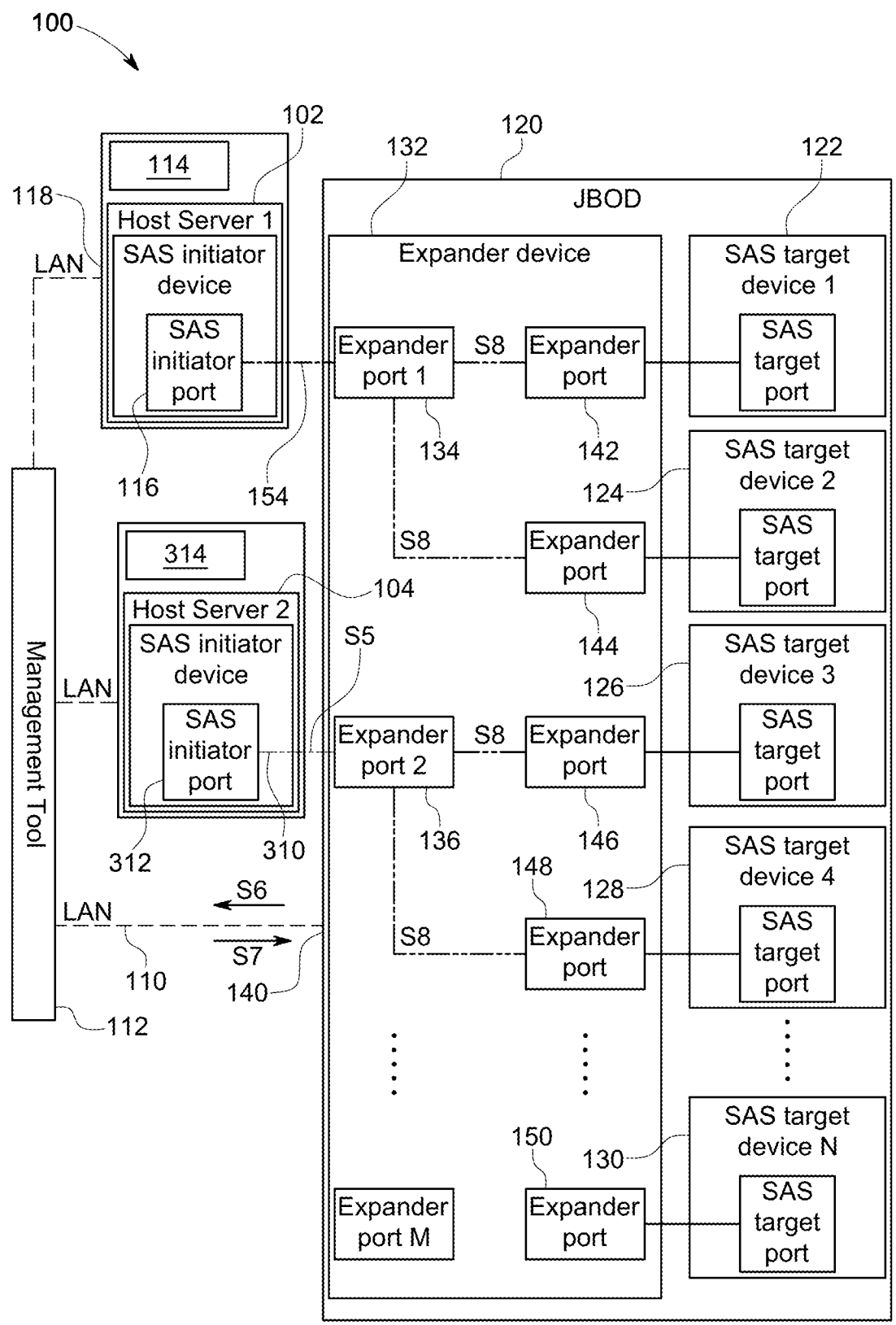
FIG. 3 is a block diagram of the system in FIG. 1 showing the reconfiguration of the SAS zones for two host servers.

FIG. 3 shows the operation of automatic SAS zone configuration for the system 100 in FIG. 1, when another server is added to the configuration in FIG. 2. This requires a reconfiguration of the SAS zones to allow proper access for the connected host servers to the target devices 122, 124, 126, 128, and 130. Like elements in FIG. 3 are labeled with identical numbers as their counterparts in FIGS. 1 and 2. In this example, a new connection is made via the host server 104. The new connection is made by connecting a cable 310 between a SAS initiator port 312 of the server 104 and the expander input port 136 of the expander device 132.

Once the cable 310 connects the SAS initiator port 312 to the input port 136, the management tool 112 sends a command to a BMC 314 on the host server 104 to obtain the cable ID of the cable 310 via the LAN 110 for connection status detection. In this example, the management tool 112 will find two servers (servers 102 and 104) are connected to the SAS storage device 120 and thus a change in the configuration in FIG. 2 is required for the new host server 104 to access target devices. The management tool 112 will send a SAS automatic zoning configuration command to the SAS storage device 120. The configuration command is received via the LAN 110 at the LAN port 140 of the SAS storage device 120. The SAS storage device 120 follows the SAS automatic zoning configuration command and changes connections in the expander device 120 to follow the zoning configuration. In this example, the automatic zoning configuration command results in connecting the expander input port 134 to the expander target ports 142 and 144 for one SAS zone. Thus, in this new configuration, the server 102 is connected to the target devices 122 and 124 via the expander target ports 142 and 144. The automatic zoning configuration command also results in connecting the expander input port 136 to the target ports 146 and 148 for another SAS zone. The server 104 is thus connected to the target devices 126 and 128 via the expander target ports 146 and 148.

In this example, the automatic configuration command allocates two target devices to each server. Of course other configurations that allocate fewer or more target devices may be used by the management tool 112 depending on the predetermined rules. The automatic configuration avoids the need for manual reconfiguration and therefore allows operation of the system 100 to continue when a new server is added.

Figure 4:
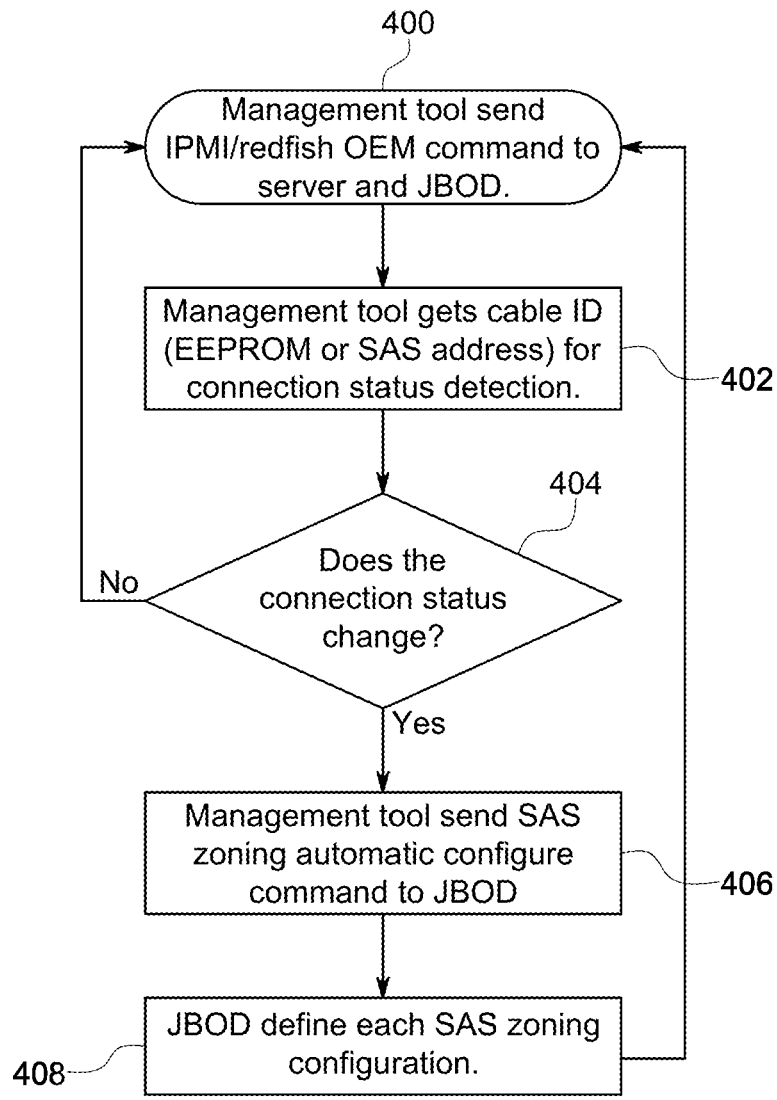
FIG. 4 is a block diagram of the routine for automatically configuring SAS zones based on cable connection.

FIG. 4 is a flow diagram of the periodic routine run by the management tool 112 in FIG. 1 to automatically configure the SAS zones of the system 100. The management tool 112 first sends an IPMI/Redfish OEM command to the attached host servers and the SAS storage system 120 (400). In this example the BMC of each of the attached host servers and the SAS device 120 sends the cable ID to the management tool 112 to allow the management tool 112 to detect connection status of the attached servers, in relation to the input ports of the expander 132 (402). Alternatively, a daemon on the host server and a BMC on the SAS device 120 may send the cable ID. The management tool 112 determines whether the connection status of any of the input ports of the expander 132 has changed, thus indicating a new connection (404). If there is no change in connection status, the management tool 112 loops back to beginning the routine at the next period of time.

If there is a change in connection status, the management tool sends an automatic SAS zoning command to the SAS system 120 (406). Based on the new connections, the SAS system 120 redefines the zoning configurations for each of the connected hosts and target devices (408). The routine then loops back to beginning the routine at the next period of time.

The flow diagram in FIG. 4 is representative of example machine readable instructions for the system 100 in FIG. 1. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system that allows automatic serial-attached SCSI (SAS) zoning configuration, the system comprising:
a local area network;
a SAS system having a local area network port coupled to the local area network, a plurality of SAS target devices, and an expander having a plurality of input ports and a plurality of target ports, wherein at least some of the target ports are coupled to the SAS target devices; and
a management tool coupled to the local area network, wherein the management tool is operable to detect a cable connection between a first host device and an input port of the plurality of input ports by determining a cable ID from the cable; and
automatically configure a SAS zone to assign target devices to the first host device based on the cable connection between the first host device and the input port detected by determining the cable ID.

2. The system of claim 1, wherein the first host device is a server.

3. The system of claim 1, wherein at least one of the target devices is a storage device.

4. The system of claim 1, wherein the first host device includes a baseboard management controller operable to send the cable ID to the management tool via the local area network, when the first host device is connected to the SAS system.

5. The system of claim 4, wherein the management tool is operable to detect the status of the connection between the first host device and an input port of the expander via the cable ID.

6. The system of claim 1, wherein the management tool is further operable to reconfigure SAS zones when a second host device is coupled to another input port of the expander to assign target devices to the second host device.

7. The system of claim 1, wherein the management tool is operable to periodically detect the status of the input ports of the expander to determine if a new connection has been made.

8. A method of automatic configuration of serial-attached SCSI (SAS) zones in a system having a local area network; a SAS system having a local area network port coupled to the local area network, a plurality of SAS target devices, and an expander having a plurality of input ports and a plurality of target ports, wherein at least some of the target ports are coupled to the SAS target devices; and a management tool coupled to the local area network, the method comprising:
coupling a first host device to the local area network and one of the input ports of the expander via a cable, the cable including a cable ID;
detecting a cable connection between the first host device and the input port based on the detected cable ID associated with the first host device; and
automatically configuring a SAS zone to assign target devices to the first host device based on the cable connection between the first host device and the input port detected by determining the cable ID via the management tool.

9. The method of claim 8, wherein the first host device is a server.

10. The method of claim 8, wherein at least one of the target devices is a storage device.

11. The method of claim 8, wherein the first host device includes a baseboard management controller, the method further comprising sending the cable ID via the baseboard management controller to the management tool via the local area network when the first host device is connected to the SAS system.

12. The method of claim 11, wherein the detecting of the cable connection includes detecting the status of the connection between the first host device and an input port of the expander via the cable ID.

13. The method of claim 8, further comprising reconfiguring the SAS zones when a second host device is coupled to another input port of the expander to assign target devices to the second host server.

14. The method of claim 8, further comprising periodically detecting the status of the input ports of the expander to determine if a new connection has been made.

* * * * *